Sept. 23, 1941.   C. SAUZEDDE   2,256,498
HYDROSTATIC BRAKE
Filed June 27, 1939   3 Sheets-Sheet 1

Inventor
Claude Sauzedde,
By
Attorneys

Sept. 23, 1941.  C. SAUZEDDE  2,256,498

HYDROSTATIC BRAKE

Filed June 27, 1939  3 Sheets-Sheet 3

Inventor
Claude Sauzedde,
By
Attorneys

Patented Sept. 23, 1941

2,256,498

UNITED STATES PATENT OFFICE 2,256,498

HYDROSTATIC BRAKE

Claude Sauzedde, Detroit, Mich., assignor to Detroit Hydrostatic Brake Corporation, Detroit, Mich., a corporation of Michigan Application June 27, 1939, Serial No. 281,447

12 Claims. (Cl. 188—152)

This invention relates, in general, to hydrostatic brakes and, in particular, to that type of brake employing frusto-conical braking shoes and drums.

One of the objects of the invention is to improve the frusto-conical type of hydrostatic brake so as to render said brake more efficient by minimizing the wearing effect of torque reaction, due to braking, on the relatively movable parts of the brake.

Another object is to adapt a brake employing frusto-conical shoes and drums for self-alignment of said shoes in said drums by improving and providing between the relatively movable parts of the brake novel means novelly arranged, whereby said shoes are movable axially with respect to said drums for permitting the former to attain their most proper and efficient position in the latter, while at the same time said shoes are prevented from moving circumferentially.

Another object herein is to improve the relatively movable parts of a vehicle brake and to provide therebetween surface contacts, as distinguished from point or line contacts, which tend to absorb more efficiently the torque reaction of braking and which, in addition, tend to increase the life of said parts by minimizing the wear thereof, by providing inexpensive means easily and readily installed or replaced, the assembly as a whole operating more efficiently and longer without attention than brake assemblies at present in use.

Still another object is to provide the drum of a brake having a shoe engageable with said drum with a removable and replaceable heat and wear resisting metallic lining for increasing the life of the drum.

Other objects and advantages will become readily apparent from a reference to the following specification taken in conjunction with the accompanying drawings of which there are three (3) sheets and in which.

Figure 1:
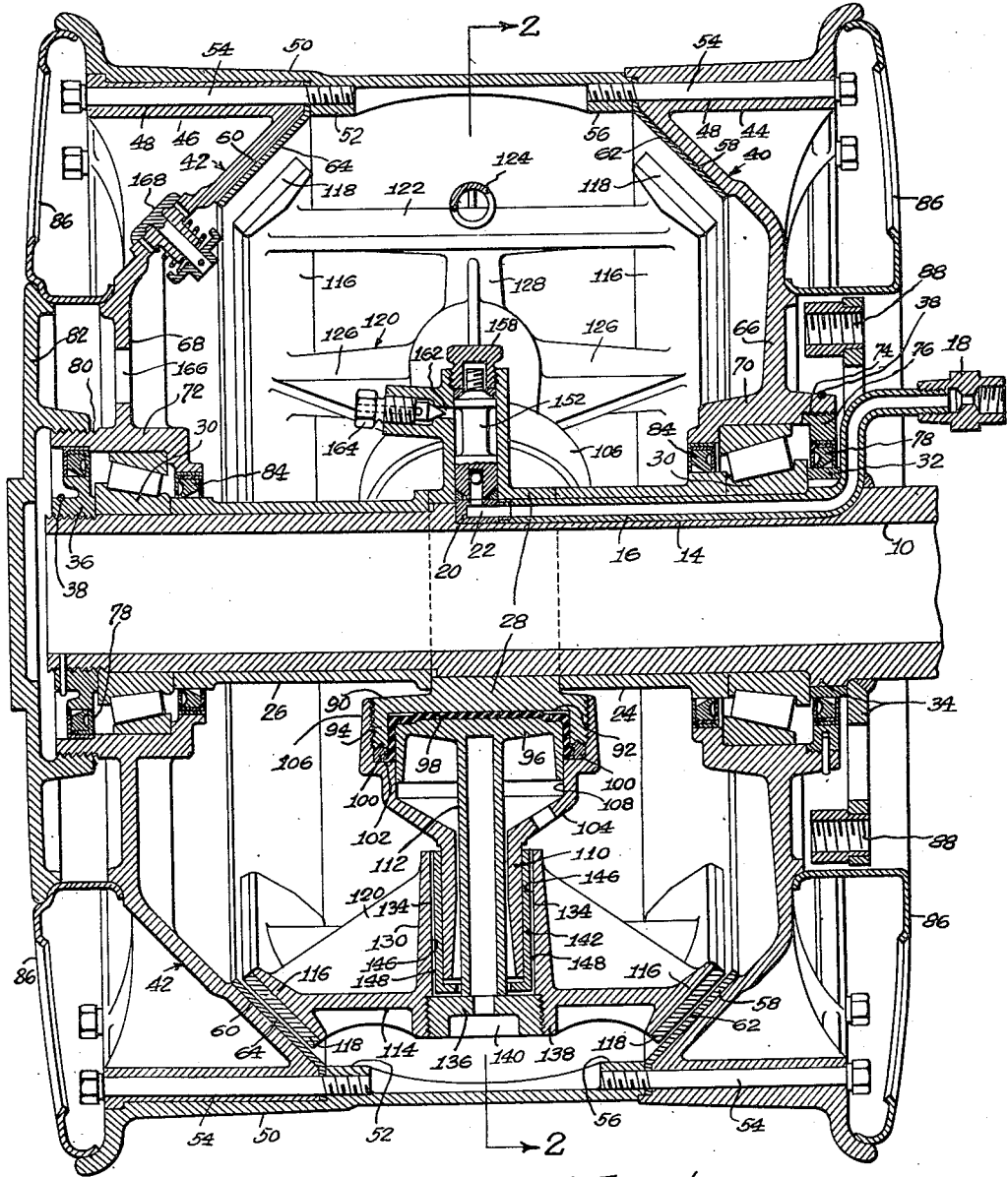
Figure 1 is a sectional view taken longitudinally through the wheel axis and transversely through the wheel and brake and showing the invention incorporated therein.
Figure 2:
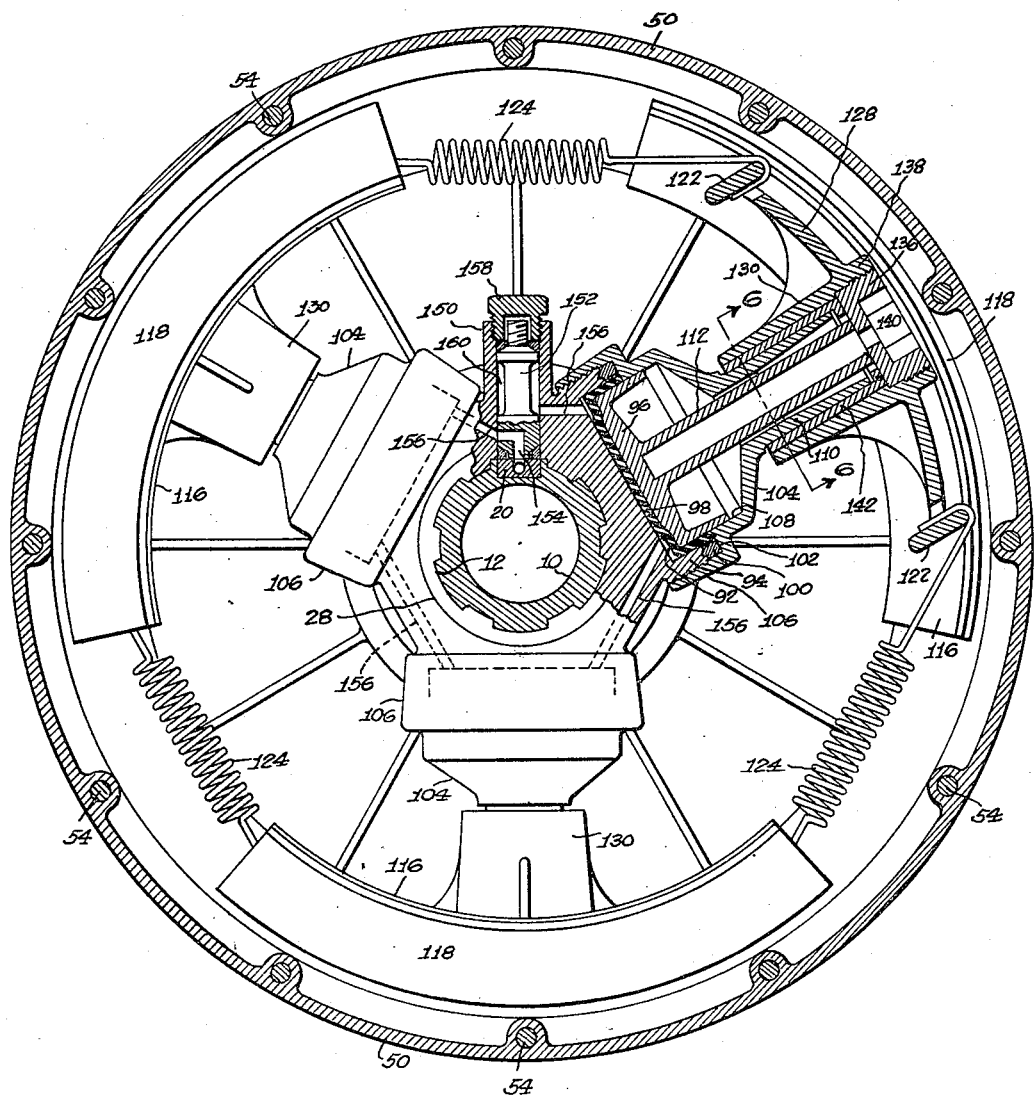
Fig. 2 is a sectional view taken at right angles to Fig. 1 and particularly along the line 2—2 therein.

Referring to Figs. 1 and 2 of the drawings, the numeral 10 represents a hollow "dead" axle, externally splined among its length, as at 12, and supported in the usual manner by the usual fixed and stationary means (not shown) provided therefor on the vehicle. Axle 10, at its periphery and adjacent its supported end, is formed with a slot 14 which extends axially for a distance therealong and into which is pressed a fluid duct 16, one end of duct 16 being spaced from axle 10 and leading into a fitting 18 which is supported by said stationary part (not shown) of the vehicle and in communication with the usual fluid pressure line (not shown) leading from the brake pedal (not shown) or other brake actuating means of the vehicle. Between the other end of duct 16 and the adjacent end of slot 14 there is disposed a plug 20 having internally formed therein an L-shaped passageway 22, one end of this passageway 22 being in communication with the passageway in duct 16 and the other end thereof being in communication with a member to be described later.

Supported on axle 10 against rotation by the splined portion 12, on each side of the plug 20, is one of a pair of internally splined sleeves 24 and 26, and between these sleeves 24 and 26, on axle 10, is disposed an internally splined, annular, stationary spider, generally indicated at 28. The sleeves 24 and 26 abut opposite sides of the spider 28 and hold the latter in a centered position by means of a pair of anti-friction bearing assemblies, each being generally indicated at 30, one of which assemblies 30 being held against sleeve 24 by means of a centering ring 32 disposed between the assembly 30 and the face of a flange 34 secured to a fixed portion (not shown) on the vehicle, and the other of which assemblies 30 being held against sleeve 26 by means of an internally threaded nut 36 threadedly secured to the free end of axle 10 and tightened up against the outer end of the assembly 30. A lock ring 38 is employed in the usual manner for preventing nut 36 from becoming inadvertently loosened.

For forming the braking chamber around the axle 10 and in which the brakes and actuating mechanism therefor are disposed, a pair of radially extending and oppositely inclined annular disc members, generally indicated at 40 and 42, is employed. Members 40 and 42 are provided at their peripheries with annular flanges 44 and 46, respectively, said flanges extending oppositely to each other and in the direction of the wheel axis and each being provided with a plurality of spaced bores 48 extending therethrough. Telescopically disposed with respect to flange 46 is an annular rim member 50 which is internally formed with a plurality of spaced lugs 52 which are adapted for abutting engagement with the disc 42, lugs 52 being provided with internally threaded bores in alignment with bores 48 in flange 46, and there being employed a plurality of threaded bolts 54 which pass through the bores 48 into the bores in the lugs 52 for securely holding the members 42 and 50 together. Rim 50 extends beyond the lugs 52 and at its end there is internally provided another set of spaced lugs 56 to which is secured, by means of a similar set of bolts 54 and in a manner similar to that above, the disc 40. It will be seen in assembly that member 50 and the outer surface of flange 44 of disc 40 combine to form the tire carrying surface of the tire rim, members 50 and 40 being provided peripherally with the usual shoulder portions for aiding in the retention of the tire on rim 44—50.

Discs 40 and 42, within their flanges 44 and 46, are formed with oppositely inclined annular portions 58 and 60, respectively, the inner surfaces of which portions being faced with removable, non-rotatable, heat resisting, metallic facings 62 and 64, respectively, said facings 62 and 64 being secured at their peripheries between the respective flanged portions 44 and 46 of discs 40 and 42 and the rim member 50 by means of the bolts 54 and comprising the frusto-conical braking surfaces for the brake shoes employed in the brake chamber defined by the discs 40 and 42 and the rim member 50.

Radially inwardly of the inclined portions 58 and 60 of the discs 40 and 42 there are formed on said discs radial portions 66 and 68, respectively, and hub portions 70 and 72, respectively. Hub portion 70 is formed at its outer end with an internally threaded bore 74 into which is screwed a nut 76 and between which nut 76 and the centering ring 32 is disposed an annular seal 78 for preventing dirt from entering the inner bearing chamber. The outer end of hub portion 72 is externally threaded, as at 80, and is provided thereat with an internally threaded hub cap 82, there being provided between the hub portion 72 and the nut 36 another annular seal 78 which is adapted for preventing dirt from entering the end bearing chamber. The inner end of each hub portion 70 and 72 is provided with an annular seal 84 which is confined between the axle 10 and the respective hub portion 70 or 72 and prevents oil or grease from entering the braking chamber from either of the bearing chambers. It is apparent that the hub portions 70 and 72, between the respective seals 78 and 84, ride on the bearing assemblies 30. Nut 76 is held in place by another lock ring 38.

On either side of the wheel, principally for decorative purposes, there is provided an annular spoke simulating member 86, members 86 being held in place between the tire retaining shoulders formed on the members 40 and 50 and shoulders formed on the outer walls of the radial portions 66 and 68 of the discs 40 and 42, respectively. The inner periphery of the outer member 86 is engaged by the periphery of the hub cap 82 for better holding said member 86 in place, and it is to be noted that the flange 34 at the opposite end of the wheel, with annularly spaced threaded openings 88 therein, is adapted for having connected thereat an annular cover plate (not shown) which could very easily be made to better support the adjacent member 86, if desired.

Still referring to Figs. 1 and 2, it will be noted that the non-rotatable annular spider 28, which is splined to axle 10 and which is disposed between the sleeve members 24 and 26, is centrally confined within the braking chamber. The spider 28 is formed integrally with a plurality of equally spaced, radially extending, cylindrical formations 90 providing in each thereof a fluid pressure chamber 92 and each having an outer threaded wall 94. Purely for purposes of illustration there are shown three of such cylindrical formations 90 with their attending mechanisms, but it should be understood and readily recognized that the invention to be described contemplates and can accommodate other numbers and arrangements. In each chamber 92 a piston 96 is reciprocally mounted, and between the face of each piston and the wall of each chamber in which the piston is mounted there is disposed a cup-shaped resilient seal 98 to the periphery of which is bonded an annular metallic reinforcing member 100. Member 100 overlies the end of the body of cylinder 90 and is secured in place thereat by an annular shoulder 102 formed internally of a hollow body member, indicated at 104.

Member 104, radially inwardly of shoulder 102, is integrally formed with an annular portion 106 which is internally threaded and adapted for being stationarily secured to the externally threaded portion 94 of cylinder 90, and, radially outwardly of shoulder 102, member 104 is formed internally with a cylindrical bore 108 which has a diameter substantially equal to the outer diameter of piston 96 and is adapted for reciprocation of said piston therein. The end of member 104 opposite the internally threaded end 106 thereof is reduced and formed as a cylinder 110, the outer diameter of which being uniform along the length of cylinder 110 and substantially less than the diameter of bore 108, and the inner diameter of which at its narrowest point being slightly larger than the outer diameter of a neck portion 112 formed integrally on piston 96 so that neck 112 of piston 96 is free to reciprocate internally of the cylindrical portion 110 of member 104 as piston 96 reciprocates in fluid chamber 92 of spider 28 and bore 108 of member 104. During operation or inoperation of the brake the head of piston 96 is adapted for occupying both the chamber 92 and the bore 108 so that positive guidance of the piston 96 is assured when brake operation is desired, and so that there will be no binding during braking between the neck portions 112 and 110 of piston 96 and member 104, respectively, whereby the clearance therebetween will be maintained. The length of bore 108 ahead of the overlapping portion of piston 96 therein is made sufficient to permit abnormal reciprocations of the piston such as occur when the system is lacking in fluid or the brake linings have been worn excessively.

Figure 3:
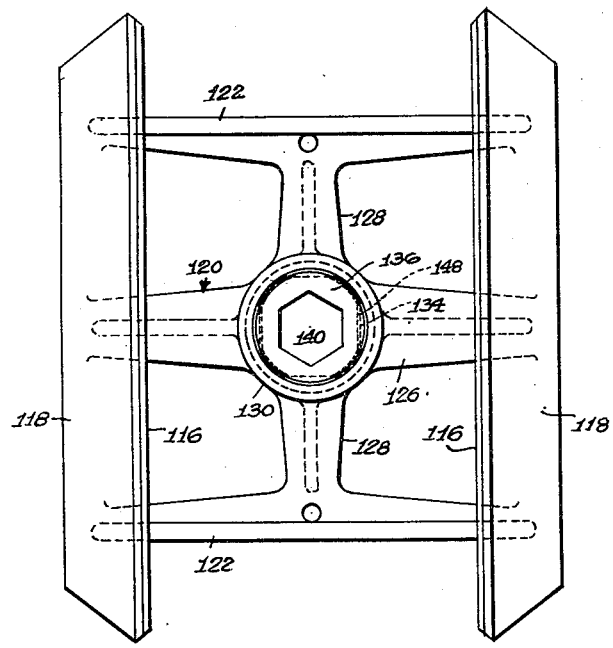
Fig. 3 is an elevational view of a brake shoe unit adapted for employment with the wheel brake shown in Figs. 1 and 2.
Figure 4:
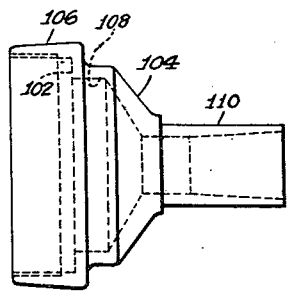
Fig. 4 is an elevational view of one of the details of the invention.
Figure 5:
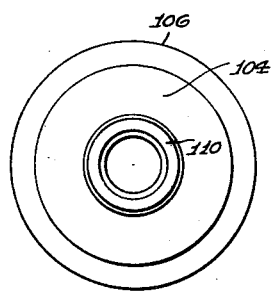
Fig. 5 is a top plan view of the detail shown in Fig. 4.
Figure 6:
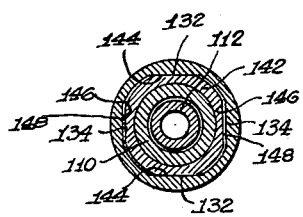
Fig. 6 is a detailed sectional view taken along the lines 6—6 in Fig. 2.

Radially outwardly of each actuating unit just described, and arranged centrally with respect thereto, is a brake shoe unit, indicated at 114, comprising a pair of arcuate and oppositely inclined brake shoes 116 each lined with a lining 118, and each secured together in spaced relation for proper engagement with the metallic braking facings 62 and 64 by a web formation, generally indicated at 120 (see Fig. 3). Each web formation 120 has a cross brace 122 at each end, and a spring 124 is hooked over each pair of adjacent braces 122 disposed on the adjacent formations 120 whereby the brake shoe units 114 are normally constrained radially inwardly. Each web formation 120 also has a central cross brace 126 and a longitudinal brace 128, the latter extending normal to the braces 122 and 126 between the braces 122 and centrally intermediate the two brake shoes 116 in each unit 114. At the juncture of braces 126 and 128 of each web formation 120 there is integrally formed an annular hollow, radially inwardly directed portion 130 the internal bore of which has two pairs of oppositely disposed parallel walls 132 and 134 (see Figs. 3 and 6) with the corners therebetween being rounded off. Parallel walls 132 extend along their widths in the direction of the wheel axis, and parallel walls 134 extend along their widths in the direction of the wheel circumference or, in other words, normal to the walls 132. The distances between walls 132 and between walls 134 are uniform along the length of the hollow portion 130 of each web formation 120, said walls terminating at the base of an externally threaded, cup-shaped plug 136 threadedly secured in an internally threaded, outwardly extending end portion 138 of the hollow portion 130 of each web formation 120. A depression 140 in plug 136 is adapted for the insertion therein of a tool (not shown) for tightening or removing said plug in or from the threaded end 138 of portion 130 of web formation 120. Neck 112 is in driving engagement with nut 136.

About the neck portion 110 of each hollow body member 104 is freely disposed an annular sleeve member 142, the inner wall of member 142 being purely cylindrical and of substantially the same diameter as the outer diameter of the purely cylindrical outer wall of said portion 110 of said member 104. The outer surface of each of the members 142 comprises two pairs of oppositely disposed parallel walls 144 and 146 (see Figs. 3 and 6) with the corners therebetween being rounded off, walls 144 being parallel with walls 132 of portion 130 of web formation 120, and walls 146 being parallel with walls 134 of portion 130 of web formation 120. It will be noted that a clearance 148 is provided between each wall 134 and the wall 146 adjacent thereto, but that no such clearance is provided between each wall 132 and the wall 144 adjacent thereto.

In view of the fact that the web formation 120 of each brake shoe unit 114 is usually a casting of aluminum or of an alloy thereof and, therefore, inherently soft, the contacting surfaces of the relatively movable parts of the brake actuating mechanism quickly wear down so that replacement of these parts is a factor of often and expensive repair. To provide surface contact between the outer wall and the inner wall of the relatively movable portions 110 and 130, by doing without the member 142, would necessitate replacement of either or both of the members 104 and 120 after some use. By employing the member 142, however, same can be replaced as often as desirable without appreciable cost or expense. By providing the members 130 and 142 with walls 132 and 144, respectively, same being parallel with the wheel axis and each adjacent pair thereof being in surface contact with each other, the brake shoe unit 114 is prevented against circumferential movement during braking, said surface contact, due to the flatness or parallelism of each pair of adjacent walls 132 and 144, minimizing the wear therebetween as distinguished from the wear which would result if the walls 132 and 144 were arcuate and in point contact, and also more effectively taking up the torque reaction due to braking. By providing the clearances 148 between the two pairs of adjacent walls 134 and 146, the brake shoe unit 114 is free to move laterally from side to side in an axial direction for self-alignment of said unit with the drums, during which self-alignment and resulting contact between either pair of adjacent walls 134 and 146 said contact is a surface contact rather than a point contact because of the flatness or parallelism of said walls.

Spider 28, intermediate two of the cylinder formations 90 thereon, is formed with a hollow boss 150 in which is mounted a distributor plug 152. Plug 152 at its lower end is formed with an L-shaped fluid passageway 154, one end of passageway 154 being in communication with the fluid passageway 22 in plug 20, and the other end of passageway 154 being in communication with one of a series of fluid passageways 156 formed in the spider 28, passageways 156 intercommunicating the fluid pressure chambers 92. A nut 158 is threadedly secured into the outer end of the boss 150, and between nut 158 and plug 152 and between plugs 20 and 152 there is provided the usual packing for preventing the escape of fluid thereat. Plug 152 intermediate its ends is reduced in cross section to provide an annular duct 160 within the bore of boss 150, duct 160 communicating one of the passageways 156 in spider 28 with a passageway 162 in boss 150, passageway 162 being independent of passageway 154 and closed by a bleeder screw 164. An opening 166 in the radial portion 68 of disc member 42 is preferably provided whereby the screw 164 is readily accessible when it is desired to bleed the fluid system of the brake.

If desired, a spring opposed, pressure actuated, one-way valve 168 may be provided, and this valve, though normally closed, is capable of opening to communicate, under certain conditions, such as when the brake is employed at high altitudes and the pressure within the braking chamber is higher than that outside thereof, said braking chamber with the atmosphere. The valve shown is mounted in the inclined portion 60 of disc member 42 radially outwardly of the hub cap 82.

Although the invention has been described with some detail it is not intended that such description be definitive of the limits of the inventive idea. The right is reserved to make such changes in the details of construction and arrangement of parts as will come within the purview of the attached claims.

What I claim is:

1. In a hydrostatic brake, a pair of relatively rotatable braking members having engageable braking surfaces, means for supporting said members, a spider supported by said means, said spider having a chamber, a piston within said chamber and operable for actuating one of said members for inter-engaging said braking surfaces, means for actuating said piston, a hollow member threadedly secured to said spider coaxially with said chamber and surrounding said piston, said hollow member being adapted for guiding said piston actuated braking member, and a spacer member between said hollow member and said last mentioned braking member.

2. In a hydrostatic brake, a pair of relatively rotatable braking members having engageable braking surfaces, one of said members having a chamber, means for supporting said members, a spider supported by said means, said spider having a second chamber, a piston within said chambers and operable for actuating one of said members for inter-engaging said braking surfaces, means for actuating said piston, a hollow member threadedly secured to said spider coaxially with said chambers and surrounding said piston, said hollow member extending into said first chamber for guiding said piston actuated braking member, and a sleeve supported about said hollow member for spacing the latter from the wall of said first chamber.

3. In a hydrostatic brake, a pair of relatively rotatable braking members having engageable braking surfaces, one of said members having a chamber, means for supporting said members, a spider supported by said means, said spider having a second chamber, a piston within said chambers and operable for actuating one of said members for inter-engaging said braking surfaces, means for actuating said piston, a hollow member threadedly secured to said spider coaxially with said chambers and surrounding said piston, said hollow member extending into said first chamber for guiding said piston actuated braking member, a sleeve supported about said hollow member for spacing the latter from the wall of said first chamber, and a closure member in one end of said first chamber in driven engagement with said piston and removable for causing the removal of said sleeve.

4. In a hydrostatic brake, a pair of complementary frusto-conical braking members, said members having engageable complementary frusto-conical braking surfaces, means for supporting said members for relative rotation, a spider supported by said means, said spider having a chamber, a piston within said chamber and operable for radially actuating one of said members for inter-engaging said braking surfaces, means for actuating said piston, and a spacer member between the wall of said chamber and said piston actuated braking member and adapted for permitting axial movement of the latter with respect to the other braking member.

5. In a hydrostatc brake, a pair of complementary frusto-conical braking members, said members having engageable complementary frusto-conical braking surfaces, means for supporting said members for relative rotation, a spider supported by said means, said spider having a chamber, a piston within said chamber and operable for radially actuating one of said members for inter-engaging said braking surfaces, means for actuating said piston, and a hollow spacer member between the wall of said chamber and said piston actuated braking member and providing a clearance between said latter member and said spacer member adapted for permitting axial movement of said braking member with respect to the other braking member.

6. In a hydrostatic brake, a pair of complementary frusto-conical braking members, said members having engageable complementary frusto-conical braking surfaces, means for supporting said members for relative rotation, a spider supported by said means, said spider having a chamber, a piston within said chamber and operable for radially actuating one of said members for inter-engaging said braking surfaces, means for actuating said piston, and a hollow spacer member between the wall of said chamber and said piston actuated braking member and having a pair of parallel outer walls spaced from said braking member and adapted for permitting axial movement of the latter with respect to the other braking member.

7. In a hydrostatic brake, a pair of complementary frusto-conical braking members, said members having engageable complementary frusto-conical braking surfaces, one of said members having a chamber, means for supporting said members for relative rotation, a spider supported by said means, said spider having a second chamber, a piston within said chambers and operable for radially actuating one of said members for inter-engaging said braking surfaces, means for actuating said piston, and a sleeve between the walls of said chambers, the wall of one of said chambers and the adjacent wall of said sleeve each having engageable flattened surfaces for providing surface contact therebetween.

8. In a hydrostatic brake, a pair of complementary frusto-conical braking members, said members having engageable complementary frusto-conical braking surfaces, one of said members having a chamber, means for supporting said members for relative rotation, a spider supported by said means, said spider having a second chamber, a piston within said chambers and operable for radially actuating one of said members for inter-engaging said braking surfaces, means for actuating said piston, and a sleeve between the walls of said chambers, the wall of one of said chambers and the adjacent wall of said sleeve each having two pairs of oppositely disposed flattened parallel surfaces, one pair of said chamber surfaces being in constant contact with one pair of said sleeve surfaces, and the other pair of said chamber surfaces being spaced from said other pair of sleeve surfaces.

9. In a hydrostatic brake, a pair of complementary frusto-conical braking members, said members having engageable complementary frusto-conical braking surfaces, one of said members having a chamber, means for supporting said members for relative rotation, a spider supported by said means, said spider having a second chamber, a piston within said chambers and operable for radially actuating one of said members for inter-engaging said braking surfaces, means for actuating said piston, a hollow member removably secured to said spider coaxially with said chambers, said hollow member having an extended portion surrounding said piston and adapted for guiding the radial movement of said piston actuated braking member, and a sleeve mounted on said extended portion for spacing said extended portion from the inner wall of said first chamber.

10. In a hydrostatic brake, a pair of complementary frusto-conical braking members, said members having engageable complementary frusto-conical braking surfaces, one of said members having a chamber, means for supporting said members for relative rotation, a spider supported by said means, said spider having a second chamber, a piston within said chambers and operable for radially actuating one of asid members for inter-engaging said braking surfaces, means for actuating said piston, a hollow member removably secured to said spider coaxially with said chambers, said hollow member having an extended portion surrounding said piston and adapted for guiding the radial movement of said piston actuated braking member, a sleeve mounted on said extended portion for spacing said extended portion from the inner wall of said first chamber, the adjacent surfaces of said chamber inner wall and the sleeve outer wall being flattened into parallelism in at least two directions, said walls in one of said directions being in contact with each other to prevent circumferential movement of said piston actuated braking member, and said walls in another of said directions being spaced from each other to permit axial movement of said piston actuated braking member.

11. In a hydrostatic brake, a pair of braking members supported for rotation relatively one to the other and having complementary braking surfaces, means providing a fluid chamber, piston means carried within said chamber and selectively operable for effectuating inter-engagement of said surfaces, means carried by said first means and surrounding said second means for providing a definite path for the movement of the latter, and means carried by said third means and cooperable with one of said members for providing a freedom of movement between said two members in the direction of the axis of said rotation.

12. In a hydrostatic brake, a pair of braking members supported one non-rotatably and the other rotatably and having complementary braking surfaces, means supported non-rotatably and providing a fluid chamber, piston means carried within said chamber and selectively operable for effectuating inter-engagement of said surfaces, means carried by said first means and surrounding said second means for providing a definite path for the movement of the latter, and means carried by said third means and cooperable with said non-rotatable member for providing a freedom of movement between said two members in the direction of the axis of rotation of said rotatable member.

CLAUDE SAUZEDDE.